United States Patent [19]

Stephenson

[11] Patent Number: 4,776,958
[45] Date of Patent: Oct. 11, 1988

[54] FILTER ELEMENT

[76] Inventor: William R. Stephenson, 7922 Shoals Dr., Orlando, Fla. 32792

[21] Appl. No.: 29,207

[22] Filed: Mar. 23, 1987

[51] Int. Cl.⁴ .................... B01D 29/14; B01D 39/08
[52] U.S. Cl. .................................. 210/486; 210/193; 210/346; 210/461; 210/500.1
[58] Field of Search ............ 210/169, 346, 406, 416.1, 210/461, 500.1, 416.2, 193, 486, 506

[56] References Cited

U.S. PATENT DOCUMENTS

| | | | |
|---|---|---|---|
| 957,191 | 5/1910 | Pargin | 210/486 |
| 2,035,851 | 3/1936 | Walker | 210/346 |
| 2,426,618 | 9/1947 | Klein | 210/486 |
| 3,481,479 | 12/1969 | Hoskins et al. | 210/484 |
| 3,679,061 | 7/1972 | Davis | 210/486 |

FOREIGN PATENT DOCUMENTS

| | | | |
|---|---|---|---|
| 617463 | 4/1961 | Canada | 210/193 |
| 2189096 | 1/1974 | France | 210/486 |

Primary Examiner—Richard V. Fisher
Assistant Examiner—Linda S. Evans
Attorney, Agent, or Firm—William M. Hobby

[57] ABSTRACT

A diatomaceous earth caking filter element includes a first elongated tubular manifold having a slot therein and a suction coupling formed thereon for drawing a liquid from said first manifold. A second elongated tubular manifold has a slot therein and a plurality of hollow pipes connected between the first and second manifolds with one end of each pipe extending into the first manifold through the slot therein and the other end of each pipe extending into the second manifold through the slot therein. Each pipe is held by the slot edges of each manifold extending into an annular groove on each end of each pipe. A filter cake screen covers both sides of the plurality of hollow pipes for catching a filtering medium, such as diatomaceous earth, thereon for filtering liquid passing therethrough, so the liquid can be drawn through the filter medium and filter screen into the first and second manifolds and out the suction coupling. The liquid is drawn into both manifolds at both ends of the filter element to provide a more uniform flow of liquid through the filter cake and screen and to provide a more even distribution of the filter cake.

5 Claims, 1 Drawing Sheet

U.S. Patent    Oct. 11, 1988    4,776,958
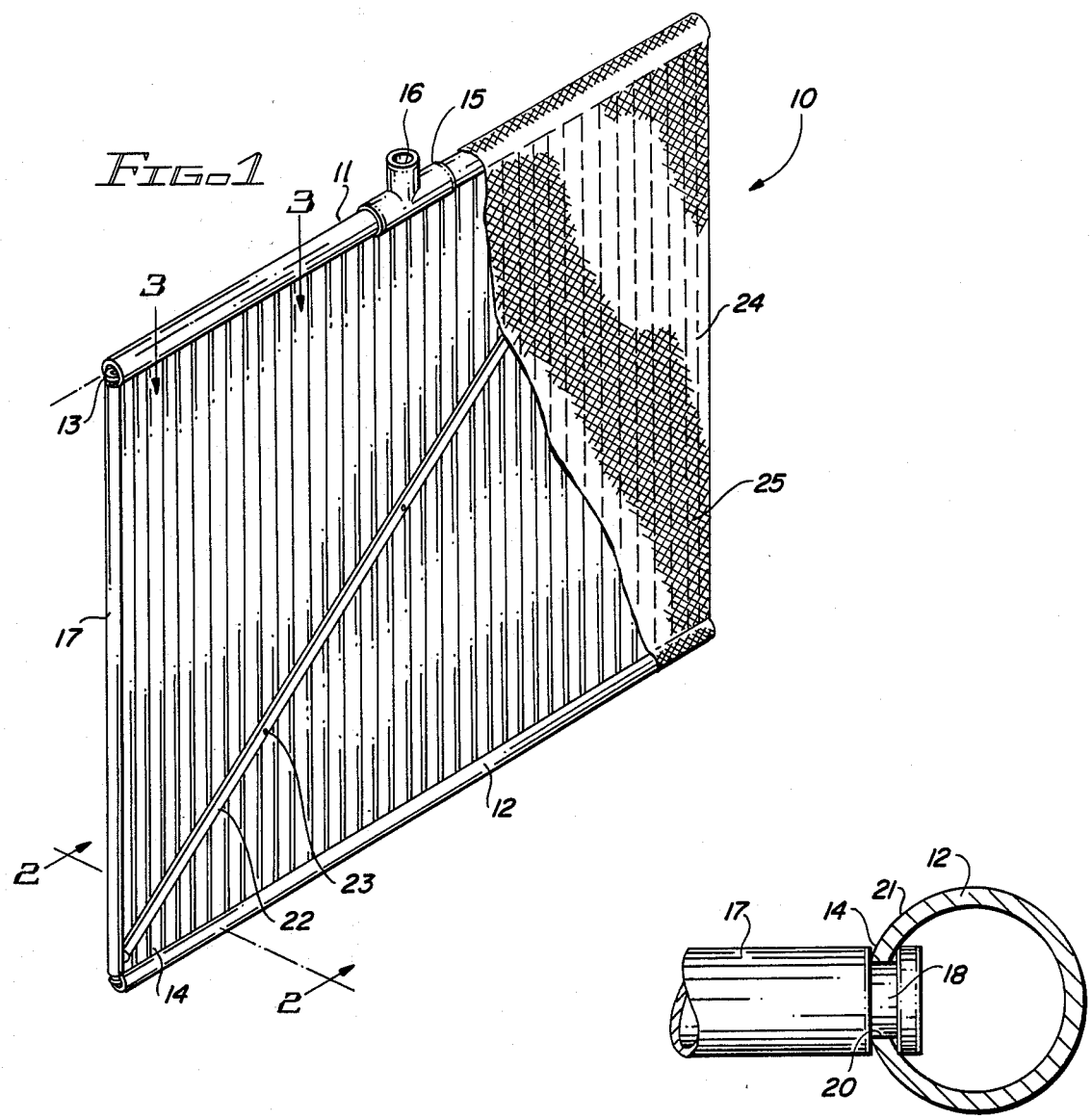
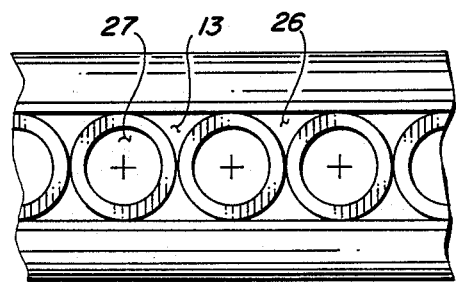
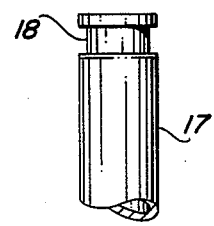

FILTER ELEMENT

BACKGROUND OF THE INVENTION

The present invention relates to filtering elements, and especially to a diatomaceous earth caking filter element for swimming pools, and the like.

In the past, a great variety of swimming pool and other liquid filters have been provided for filtering liquids therethrough. Swimming pool and water filters typically work on either pressure where a pump drives the water through the filtering element or on suction, where a pump sucks the water through the filtering element.

Typical prior art patents include sand filters in which water is drawn through pressure or suction through a pressurized container filled with sand for filtering the water with the sand. The sand filter can then be back-washed to remove accumulated filtered solids and on occasion must have the sand removed and replaced in the filter. Another common filtering technique for swimming pools uses a papaer filtering element similar to industrial filtering elements in which a paper or synthetic material is formed into a filter which is typically formed into a corrugated tube to provide a larger surface area. Liquid is drawn through the paper filtering element for filtering the liquid. Paper filtering elements are typically replaced on a periodic basis and the old filtering unit is thrown away when it becomes clogged with filtered solids. One of the more common filtering units uses diatomaceous earth, however, having a high capacity for filtering liquids passing therethrough. Diatomaceous earth, however, is commonly caked on a screen and the liquid filtered through the caked screen for filtering solids from the liquid. Diatomaceous earth can be added to the filter on a regular basis and the filter can be back-washed for removing old diatomaceous earth. In filters of this type, the diatomaceous earth is deposited on the filter medium, consisting of a very fine mesh screen placed in the liquid for preventing the passage of the diatomaceous particles contained in a slurry of liquid including the diatomaceous particles and removes all foreign matter in suspension so that the liquid finally discharged from the filter is clear and unpolluted by solid materials such as fine solids in the liquid.

One prior art Patent to Klein, U.S. Pat. No.: 2,426,618 shows a diatomaceous earth filter of the same type as employed in the present invention, and includes corrugated metal connected between two pipes with one corrugated end acting as a manifold and having a plurality of hollow nipples extending therefrom. In this type of filtering element, all of the liquid is drawn to one end of the filter element into the manifold and out the suction pipe connected to the manifold. This tends to reduce the filtering as all of the filtered liquid tends to be pulled through the filtering screen towards one end and tends to have the diatomaceous earth caking more towards that end rather than a more uniform distribution of the liquid passing through the screen in a more evenly distributed manner as in the present invention.

Other prior art filters may be seen in the Hoskins Patent, U.S. Pat. No.: 3,481,479 for a Vacuum Filter, and in the Conrad Patent, U.S. Pat. No.: 3,471,022 for a swimming pool filter having rings stacked in spaced alignment with a filter envelope enclosing the stacked rings. The stacked rings are secured together and fastened to a manifold communicating with the interior of the envelope. In U.S. Pat. No.: 4,411,782 to Auld, a means for securing a screen over a filter is provided, and allows liquid to be drawn from both ends of the filter screen.

SUMMARY OF THE INVENTION

A diatomaceous earth caking filter is provided, having a first elongated tubular manifold having a slot therein and a suction coupling formed therein for sucking a liquid from the first manifold. A second elongated tubular manifold has a slot therein and a plurality of hollow pipes are connected between the first and second manifolds. Each hollow pipe has one end extending into the first manifold through the slot therein and each other end extending into the second manifold through the slot therein. The hollow pipes are held by the manifold slot edges extending into annular grooves formed around each pipe end. A filter cake screen covers both sides of the plurality of hollow pipes for catching a filtering medium thereon for filtering liquid passing therethrough, so that a liquid can be drawn through the filtering medium and filter screen into the first and second manifolds and out the suction coupling responsive to suction being placed on the suction coupling. Additional bracing members may connect the first and second manifolds and pipes therebetween.

BRIEF DESCRIPTION OF THE DRAWINGS

Other objects, features and advantages of the present invention will be apparent from the written description and the drawings in which:

FIG. 1 is a cutaway perspective view of a filter element in accordance with the present invention;

FIG. 2 is a sectional view taken on line 2—2 of FIG. 1;

FIG. 3 is a sectional view taken on line 3—3 of FIG. 1; and

FIG. 4 is an elevational view of one end of a filter pipe in accordance with the present invention.

DESCRIPTION OF THE PREFERRED EMBODIMENT

Referring to FIGS. 1 through 4 of the drawings, a filtering element 10 in accordance with the present invention is shown in FIG. 1 having a first suction manifold 11 and a second suction manifold 12. The manifold 11 has an elongated slot 13 therein, while the manifold 12 has an elongated slot 14 extending therethrough. Manifolds 11 and 12 may be standard polyvinylchloride (PVC) pipe having the slots 13 and 14 cut thereinto. The manifold 11 has a T-joint coupling 15 therein having a suction manifold outlet 16. The manifolds 11 and 12 are connected by a plurality of abutting elongated hollow pipes 17 which may also be elongated PVC pipe of a smaller diameter size than used for the manifolds 11 and 12. Each pipe 17 has an annular groove 18 extending around each end thereof as shown in FIG. 2 and 4, so that the manifold slot 14 has an elongated edge 20 extending into the groove 18 and an elongated edge 21 extending into the other side of the pipe groove 18. The elongated pipe 17 can be made, such that, a plurality of them slide in with their grooves 18 sliding into the slots 13 and 14 of the manifolds 11 and 12. The pipes can be held in place by a flat strip 22, which can also be a flat strip of PVC material, having a plurality of threaded screws 23 threaded into selected pipes 17 to hold all the pipes together. The strip 22 can also be attached to the manifolds 11 and 12 at each end if desired.

Pipes 17 and grooves 18 are inserted to hold the pipe 17 in the slots 13 of manifold 11 and the slot 14 of manifold 12, as well as to cross-brace the filtering element. A filtering screen 24 covers the entire manifolds 11 and 12, pipe 17 and bracing 22, which when placed in a vacuum filter, will draw liquid having a slurry of diatomaceous earth therein to form a diatomaceous earth cake 25 on the filtering element 24. The liquid being drawn through the filter screen 24, and diatomaceous earth 25, is drawn towards both the manifolds 11 and 12 by the suction placed on the suction manifold coupling 16 drawing liquid from the manifold 11. The liquid is pulled through the spaces 26 as shown in FIG. 3 between the pipe 17 in the slot 13 and through similar spaces between the tube 17 connecting in slot 14 of the manifold 12. Liquid drawn into the manifold 12 is then drawn through the hollow passages 27 of the pipes 17 to the manifold 11 by the suction placed on the suction outlet 16. Thus, one outlet 16 draws liquid into the manifolds 11 and 12 simultaneously and from the manifold 12 through the hollow pipe 17 into the manifold 11. Liquid passing through the screen cover 24 and filter cake 25 is pulled towards both ends of the filter element 10 and tends to provide a much more uniform filtering through the filter element. A more uniform passage of the liquid through the filter medium tends to spread the filter cake more evenly across the filter elements and to provide for a greater passage and filtration through the filtering element with the same amount of suction on the suction outlet 16. The filtering element 10 can be rapidly made using PVC header pipes 11 and 12 having slots cut therein connected with smaller PVC pipes 17 having annular grooves 18 cut in each end thereof with a PVC flat stock 22 connecting the pipe 17 together and covering the entire filter element with a polypropylene filter screen 24 for the filter cake 25 to build up on.

However, the present invention is not to be construed as limited to the forms shown which are to be considered illustrative rather than restrictive.

I claim:

1. A diatomaceous earth caking filter element comprising:
    a first elongated tubular manifold having means defining an elongated slot therein and a suction coupling formed therein for drawing a liquid from said first manifold;
    a second elongated tubular manifold having means defining an elongated slot therein;
    a plurality of hollow abutting pipes connected between said first and second manifolds and having one end of each pipe extending into said first manifold through the means defining an elongated slot therein and the other end of each said pipe extending into the second manifold through the means defining an elongated slot therein;
    a flat brace connected across said plurality of hollow pipes at an angle to said hollow pipes and attached to some of said plurality of hollow pipes for holding said hollow pipes together;
    a filtered cake screen covering both sides of said plurality of hollow pipes for catching a filtering medium thereon for filtering liquid passing therethrough, whereby liquid can be drawn through said filter medium and filter screen into said first and second manifolds and out said suction coupling responsive to suction being placed on said suction coupling; and
    each of said plurality of hollow pipes housing means defining an annular groove on each end thereof so that the means defining an annular groove on the end of said each hollow pipe will be engaged by the edges of the means defining an elongated slot in the first tubular manifold and the means defining an annular groove on the other end of said each hollow pipe will be engaged by the edges of the means defining an elongated slot in the second elongated tubular manifold to hold each of said plurality of hollow pipes in each said manifold.

2. A diatomaceous earth caking filter element in accordance with claim 1 in which said brace member includes a flat PVC member having threaded screws attaching said bracing member to said plurality of said hollow pipes.

3. A diatomaceous earth caking filter element in accordance with claim 2 in which said first and second manifolds are PVC tubes.

4. A diatomaceous earth caking filter element in accordance with claim 3 in which said filter cake screen consists of a polypropylene screen passing over said first and second tubular manifolds and over said plurality of said pipes.

5. A diatomaceous earth caking filter element in accordance with claim 4 in which said suction coupling includes a PVC T-joint coupling coupled to said first elongated tubular manifold.

* * * * *